(12) United States Patent
Biger et al.

(10) Patent No.: US 7,499,900 B2
(45) Date of Patent: Mar. 3, 2009

(54) DEVICE, METHOD AND COMPUTER PROGRAM PRODUCT FOR SITUATION MONITORING

(75) Inventors: Ayelet Biger, Tel Aviv (IL); David Botzer, Haifa (IL); Yonit Magid, Haifa (IL); Ziva Sommer, Haifa (IL); Tali Yatzkar-Haham, Ya'ad (IL)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 11/407,762

(22) Filed: Apr. 20, 2006

(65) Prior Publication Data
US 2007/0260569 A1 Nov. 8, 2007

(51) Int. Cl.
*G06N 5/00* (2006.01)
(52) U.S. Cl. .......................... 706/47; 706/45
(58) Field of Classification Search ................ 702/109, 702/185; 706/25, 47, 45
See application file for complete search history.

(56) References Cited

U.S. PATENT DOCUMENTS

| | | | |
|---|---|---|---|
| 4,920,499 A | | 4/1990 | Skeirik |
| 5,408,588 A | * | 4/1995 | Ulug ........................... 706/25 |
| 5,467,428 A | * | 11/1995 | Ulug ........................... 706/25 |
| 5,493,516 A | * | 2/1996 | Broomhead et al. ......... 702/109 |
| 5,566,092 A | * | 10/1996 | Wang et al. ................. 702/185 |
| 6,847,957 B1 | | 1/2005 | Morley |
| 6,856,980 B2 | | 2/2005 | Feldman |
| 2002/0049691 A1 | | 4/2002 | Majoor |
| 2003/0163783 A1 | | 8/2003 | Chikirivao |

* cited by examiner

*Primary Examiner*—Wilbert L Starks, Jr.

(57) ABSTRACT

A method, device and computer program product that monitor situations. The method includes: processing information indicative of an occurrence of events to detect, in response to a current rule set, an occurrence of at least one situation that belongs to a situation set; wherein at least one rule sub-set out of the rule set defines at least one relationship between events that should occur within a lifespan; receiving a request to update a first rule; updating the first rule to provide a first updated rule while continuing to detect an occurrence of situations not affected by the update of the first rule.

6 Claims, 3 Drawing Sheets

100

DEVICE, METHOD AND COMPUTER PROGRAM PRODUCT FOR SITUATION MONITORING

FIELD OF THE INVENTION

The present invention relates to a method, a device and a computer program product that monitor situations.

BACKGROUND OF THE INVENTION

Various prior art monitoring and management systems were developed during the last decade. These systems were able to detect an occurrence of an event and respond by performing a predefined action. These systems were memory-less systems in the sense that the predefined actions were responsive to currently occurring events, and not responsive to events that occurred in the past.

The following U.S. patents and patent applications, all being incorporated herein by reference, illustrates some prior art systems and methods: U.S. patent application publication serial number 2002/0049691 of Majoor titled "Mechanism and method for continuous operation of a rule server", U.S. Pat. No. 6,856,980 of Feldman et al., titled "Hybrid use of rule and constraint engines"; U.S. patent application publication serial number 2003/0163783 of Chikirivao et al., titled "System and method for developing rules utilized in a knowledge management system"; and U.S. Pat. No. 6,847,957 of Morley titled "Dynamically extensible rule-based expert-system shell for database-computing environments".

Events as well as responses were defined by one or more rule. Definition updates included shutting down the system and re-initializing the system. In highly complex systems that can support a very large number of rules the initialization process can be time consuming.

Various management systems (as well as monitoring systems) are required to be highly available and work continuously over very long time periods. There is a growing need to perform rules updates without substantially disturbing the operation of the system.

SUMMARY OF THE PRESENT INVENTION

A method for situation monitoring, the method includes: processing information indicative of an occurrence of events to detect, in response to a current rule set, an occurrence of at least one situation that belongs to a situation set; wherein at least one rule sub-set out of the rule set defines at least one relationship between events that should occur within a lifespan; receiving a request to update a first rule; updating the first rule to provide a first updated rule while continuing to detect an occurrence of situations not affected by the update of the first rule.

Conveniently, the receiving is followed by validating the request and rejecting a non-valid request.

Conveniently, the updating is followed by restarting a detection of each situation that is defined by a situation definition that comprises the first updated rule.

Conveniently, the updating is followed by restarting a detection of a situation out of the situation set if a detection of an occurrence of that situation is affected by the update of the first rule.

Conveniently, the updating is followed by determining if previously detected events correspond to the first updated rule, and selectively re-starting the detection of at least one situation in response to the determination.

Conveniently, the updating is followed by detecting an occurrence of at least one situation according to the updated first rule and concurrently detecting an occurrence of at least one situation according to the first rule.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
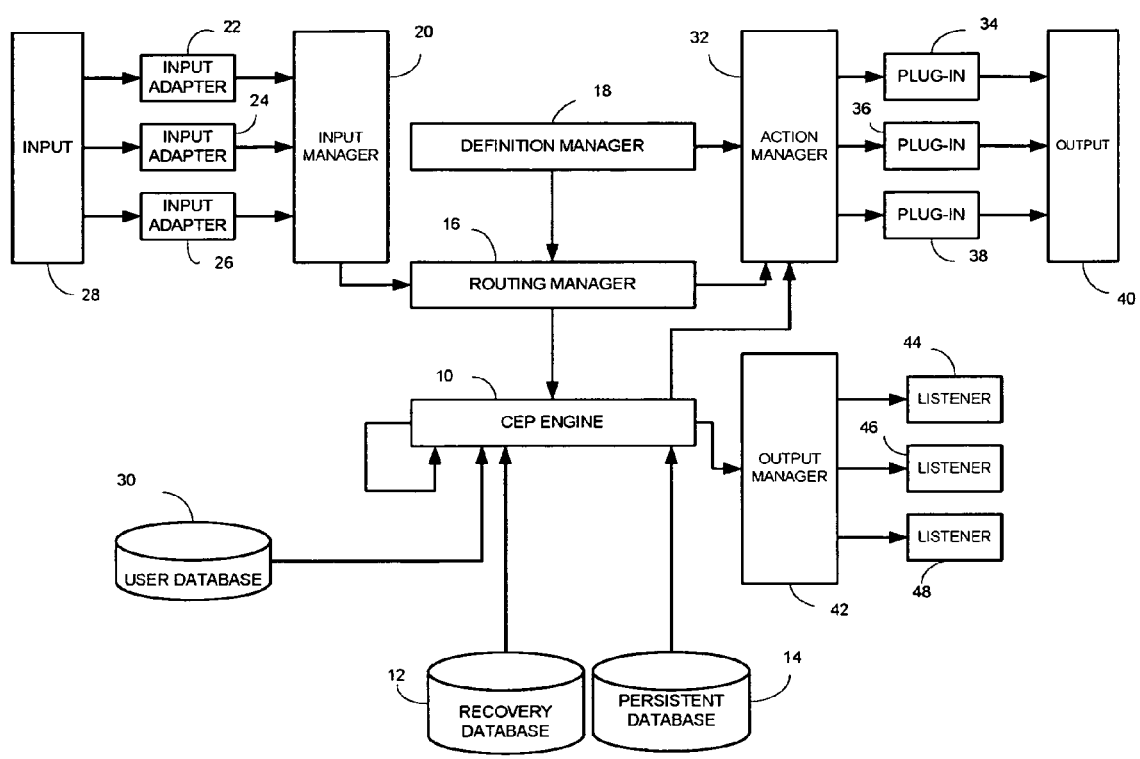
FIG. 1 illustrates a complex event processing (CEP) engine and its environment, according to an embodiment of the invention.

The invention provides a method, system and computer program product for situation monitoring. The method, system and computer product are capable of detecting situations, reacting to situations and updating the definition of situations (as well as the reaction to detected situations) without substantially disturbing the monitoring operation.

According to an embodiment of the invention multiple updates modes are available. The update modes differ from each other by the situations that their detection is restarted after a situation definition update.

Conveniently, the method, system and computer program product perform partial updating thus the detection of situations that are not affected by the update continues during the update of the definition of one or more other situations. If one or more definitions of a definition set are updated the other definition remain unchanged.

Conveniently, before an update is preformed the validity of the requested update is checked. Non-valid updates are ignored.

The validation may include checking the validity of a new definition (rule) set that merges the current definition set with the updated definition. The merging and validation occur while the current definition set is still being utilized. If the requested update is valid the updated definition set replaces the current definition set.

A complex event processing (CEP) engine is a runtime engine that can detect situations and respond to them. The response can include generating a report, performing an action and the like. A situation is detected when one or more conditions are fulfilled. The CEP engine acts according to a set of rules. The rules can define situations as well as how to respond to detected situations. These rules are also referred to as definitions.

These rules define one or more events that should occur within a certain time window (referred to as a lifespan) and the relationship between these one or two events. The rules can require that event attributes (associated with events) will have a certain value, can ignore some event attributes while taking into account other event attributes and the like.

The CEP engine can also re-enter detected situations into the CEP engine as input events.

A situation is usually characterized by one or more of the following situation characteristics: (i) name, (ii) operator, (iii) lifespan, (iv) participating events, (v) keys, and (vi) miscellaneous characteristics relating to the manner in which events are reported, and the like.

Operators define the relationships between participating events that should be fulfilled in order to detect a situation. There are various types of operators such as joint operators, count operators, absence operators, temporal (time dependent) operators and the like. Events can be filtered by filtering rules before the operators are applied.

Join operators may include: (i) "All" operator—a situation is detected if all the listed events arrive in any order. (ii) "Sequence" operator—a situation is detected if all the listed events arrive in exactly the order of the operands.

Count operators may include (i) "At least" operator—at least n events that satisfy the conditions arrived during the lifespan. (ii) "At most" operator—at most n events that satisfy the conditions arrived by the end of the lifespan. (iii) "N-th" operator—the situation is detected when the nth event arrives during the lifespan.

Absence operators may include: (i) "Not" operator—none of the listed events have arrived during the lifespan. (ii) "Unless" operator—if at least one instance of the first event class occurred and no instances of the second event class occurred during the lifespan. Only two event classes are allowed.

Temporal operators may include: (i) "Every" operator—the situation is detected every x time units since it was initiated. (ii) "After" operator—the situation is detected x time units after an event has occurred (this event is called the triggering event). (iii) "At" operator—the situation is detected at the time specified in the time pattern attribute of the situation.

Aggregation operators may include: (i) "Report" operator—enables the detection of a situation regardless of any built-in condition. (ii) "Percentage" operator—detects a situation when the calculated percentage equals a predefined percentage. (iii) "Crosses" operator—detects a situation when some predefined boundaries are crossed within a certain resolution.

A lifespan is a time interval during which particular situations are relevant. A lifespan starts with an initiator and ends with a terminator.

A lifespan initiator can be one of the following: (i) startup of the CEP engine, (ii) event initiator, (iii) absolute time. A lifespan can have more than one event initiator. The lifespan initiator can be conditional. The lifespan initiator can be characterized by a correlation parameter that determines whether to open a new lifespan if another lifespan of this situation is already open.

A lifespan terminator can be of the following types: (i) event terminator, (ii) absolute time, (iii) relative time—the lifespan is terminated after a predefined interval of time has passed since its initiation, (iv) no actual terminator. A lifespan can have more than one terminator. A termination may be conditional. A lifespan can be terminated or discarded. If the lifespan is terminated, it is still possible for a situation to be detected on termination. If the lifespan is discarded, the event instances that have accumulated during this lifespan are discarded and no detection can occur for this lifespan instance.

An event is an instance of an event class. The event classes, as well as the relationship between event classes can be updated in real time, according to one out of multiple updating modes. Each event class, as well as the relationships between the event classes are associated with attributes. Attributes can be added, removed or modified in real time. Attribute validation rules as well as limitations can be imposed on the values of the attributes.

According to an embodiment of the invention a situation can be responsive to only some event attributes while ignoring other event attributes. The CEP engine can define an event that is associated with some of the possible attributes that were defined in association with the event.

The user can define event attributes while some event attributes can be predefined (built-in). Exemplary event attributes include: (i) CreationType—defines the event creation circumstances. This attribute can have the following values: (a) IncomingEvent—the event was pushed into the CEP engine by an external source, (b) SituationEvent—the event was created by the CEP engine as a result of situation detection, (c) ExtendedEvent—the event was extended by another event, or (d) ReferencedEvent—the event was created due to a reference to another existing event. (ii) Certainty—a number attribute that indicates the certainty of an occurrence of the event. (iii) OccurenceTime—representative of the occurrence time of the event. (iv) DetectionTime—representative of the detection time of the event by the CEPengine. (iv) Count—representative of the total weights of the instances that participated in the creation of a situation. (v) Sum—representative of the total of the sum-expressions of the instances that participated in the creation of a situation. (vi) Max—representative of the maximum of the max-expressions of the instances that participated in the creation of a situation. (vii) Min—representative of the minimum of the min-expressions of the instances that participated in the creation of a situation. (viii) Average—a built-in number attribute that stores the average of the average-expressions of the instances that participated in the creation of a situation. (ix) Percentage—representative of the rate between the total weights of the instances that fulfil the satisfy condition, and the total weights of the instances that participated in the creation of a situation. (x) Creator—representative of the external event that started the reference event creation sequence until this event. (xi) DirectCreator—representative of the event that directly caused the creation of this event by reference. (xii) Distance—representative of the distance from the event that has started the whole reference sequence.

A key is a semantic equivalent that groups events together according to a set of attributes. Keys are generally used to group different events that refer to the same entity. For example, the job_id attribute in the job_queued event, and the job_id attribute in the job_canceled event are semantically equivalent, in the sense that they refer to the same job entity.

A key value can be either an attribute or an expression based on some attribute values of a certain event. A key can be characterized by: a unique name, a type and multiple key segments. A key segment refers to the value of an expression that belongs to a specific event that participates in the key.

Additional miscellaneous characteristics can define how the CEP operates. For example, events can be detected according to a detection mode selected from an immediate detection mode or a deferred detection mode. In an immediate detection mode a situation is detected and reported when the situation occurs. In a deferred detection mode a situation is detected at the end of the lifespan. The amount of times that a situation can be detected per lifespan can be limited or unlimited. The CEP can access databases and the manner in which these databases are accessed can be defined. This definition can include data base names, drivers, type (persistent or not), and the like.

Usually, persistent databases are used to store event data when a long lifespan is defined. A situation can be defined as an internal situation and accordingly its occurrence is not reported outside the CEP engine. A CEP engine can be requested to report that it completed the execution of an action that was triggered by a detection of a situation. A CEP engine can use one or more API to control the situation detection.

The CEP engine can be a situation awareness unit that is sold under the name AMIT by International Business Machines of Armonk, N.Y., U.S.A. U.S. patent application publication serial number 2005/0096966 of Adi et al, which is incorporated herein by reference, provides a brief description of the AMIL core.

FIG. 1 illustrates CEP engine 10 and its environment (collectively denoted 100) according to an embodiment of the invention.

CEP engine 10 receives data representative of an occurrence of events and determines if one or more situations have occurred. This type of information is also referred to as runtime information.

Environment 100 includes input 28, input adaptors 22-26, input manager 20, user database 30, definition manager 18, routing manager 16, recovery database 12, persistence database 14, action manager 32, plug-ins 24-38, output manager 42, listeners 44-48 and output 40.

Data representative of an occurrence of events or of rules updates is provided from input 28 via input adaptors 22-26 to input manager 20. The input adaptors 22-26 convert the received data to a format readable by the input manager 20. This format can include attributes associated with an event or an updated rule.

The input manager 20 parses the converted input data and sends relevant data fields (usually attributes) to the CEP engine 10. The input manager 20 can also send requests for definition updates to definition manager 18.

A definition update can include a definition that indicated whether the definition is a new definition, is a modification of an existing definition or is actually a request to remove (delete) an existing definition.

The following provides an example for the attribute of definition type:

```
<xs:attribute name="updateDefinition" use="optional" default="add">
    <xs:simpleType>
        <xs:restriction base="xs:string">
            <xs:enumeration value="add"/>
            <xs:enumeration value="modify"/>
            <xs:enumeration value="remove"/>
        </xs:restriction>
    </xs:simpleType>
</xs:attribute>
```

The addition of a new event:

```
<eventTypes>
    <eventType name="EndOfDay" updateDefinition="add">
        <identification createdBy="ayelet" createdOn="8/8/05" />
        <attributeType name="dateOfEnd" xsi:type="string" />
    </eventType>
</eventTypes>
```

The modification of an event:

```
<eventTypes>
    <eventType name="EndOfDay" updateDefinition="modify">
        <identification createdBy="ayelet" createdOn="8/8/05" />
        <attributeType name="weekDay" xsi:type="string" />
        <attributeType name="dateOfEnd" xsi:type="string" />
```

-continued

```
    </eventType>
</eventTypes>
```

The definition manager 18 can send rules updates that are relevant to actions to the action manager 32 and other updates to the CEP engine 10. Conveniently, the definition manager generates an updated definition set that is later sent to the CEP engine 10. This updated definition set can co-exist with a current definition set that is currently executed by the CEP engine 10.

The definition manager 18 is able to validate requests for definition updates. Non-valid definition updates are not sent to CEP engine 10. The validity of a definition update request can be determined based upon the values of the attributes associated with the definition update, the lack of expected attributes, invalid operators, conflicts between definitions, and the like.

The routing manager 16 is connected to the input manager 20, output manager 32, definition manager 18 and CEP engine 10 and determines how to transfer data between these components.

The CEP engine 10 is connected to itself (thus allowing detected situations to be treated as events), as well as to the input manager 20, the action manager 32 and the output manager 42.

The action manager 32 is connected to output 40 via plug-ins 34-38. Plug-ins 34-38 are interfaces to various applications or sub-systems. They enable the execution of predefined actions such as sending an SMS, sending emails and the like. The output manager 42 is connected to the output ports 40 via listeners 44-48.

According to an embodiment of an invention various definitions can be updated without substantially interfering with the operation of the system. These definitions can include a definition of one or more operator, a definition of one or more event, a definition of one or more lifespan, a definition of one or more key or template, and the like. It is noted that this type of update can be more complex than in memory-less systems because a current update can occur during a lifespan of a situation and one or more events that were detected before the current update can affect the detection of the situation.

Conveniently, the CEP engine 10 is adapted to update a definition of a certain situation and then re-start the detection of the occurrence of the certain situation if the update is relevant to the detection of that certain situation.

Conveniently, the CEP engine 10 is adapted to update a definition of a certain situation and utilize information representative of previously detected events, if the detected events correspond to an updated definition of the certain situation.

Conveniently, the CEP engine 10 is adapted to update a definition of a certain situation and concurrently detect an occurrence of the certain situation according to the current definition and detecting an occurrence of the certain situation according to the updated definition.

Figure 2:
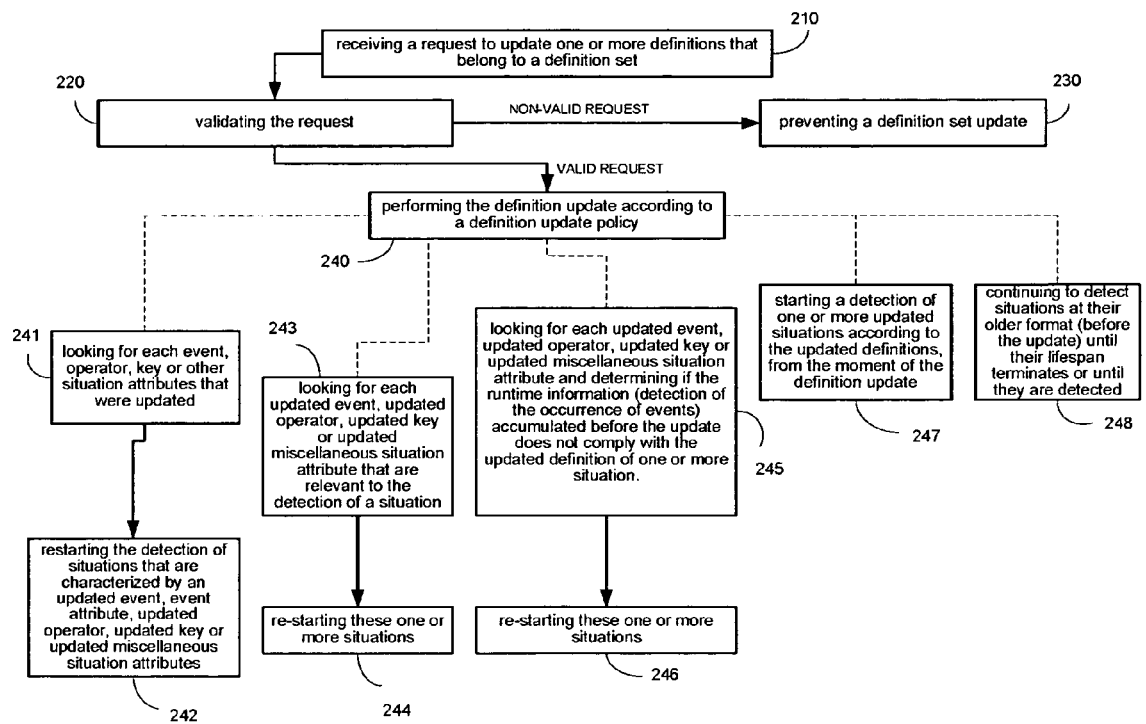
FIG. 2 illustrates a method for situation monitoring, according to an embodiment of the invention.

FIG. 2 illustrates method 200 for updating CEP definitions, according to an embodiment of the invention.

Method 200 starts by stage 210 of receiving a request to update one or more definitions that belong to a definition set. A definition set can include the entire definitions that are being used by the CEP engine, but this is not necessarily so.

The request includes the requested updates and it can be provided in various formats including a differential format or a non-differential format. A differential request includes the changes to the current definition set. A non-differential request includes an updated definition set.

Stage 210 can include parsing the received request.

Stage 210 is followed by stage 220 of validating the request. The validation can detect conflicts in definitions, missing definitions and the like.

It is noted that during the execution of stage 210 and 220 the CEP engine can continue to operate according to a current definition set.

If the request is invalid stage 210 is followed by stage 230 of preventing a definition set update. Stage 230 can include sending an invalidation message, but this is not necessarily so.

If the request is valid then stage 220 is followed by stage 240 of performing the definition update according to a definition update policy. Conveniently stage 240 includes performing a partial update—updating the definitions that are updated while not changing definitions that are not affected by the update.

According to an embodiment of the invention the definition update policy is selected from multiple definition update policies.

Conveniently, the update request includes a definition update policy attribute that defines the requested update policy.

Conveniently, the definition update policy can be selected out of the following policies: situation definition oriented update mode, situation detection affecting oriented partial update mode, situation correlative oriented partial update mode and multiple coexisting version partial update mode.

Stage 240 can includes multiple stages that correspond to the selected definition update mode. It is noted that stage 240 can include a subset of stages 241-248 mentioned below.

If a situation definition oriented partial update mode is selected then stages 241 and 242 are executed. Stage 241 includes looking for each event, operator, key or other situation attributes that were updated. It is noted that the update can include adding, removing or altering an attribute associated with the event, operator or key.

Stage 241 is followed by stage 242 of restarting the detection of situations that are characterized by an updated event, event attribute, updated operator, updated key or updated miscellaneous situation attributes. For example, if a certain event is updated—the detection of each situation that has this event as an initiator, terminator or operand, is stopped. After said stop the detection of each such situation is restarted.

If a situation detection affecting oriented mode is selected then stages 243 and 244 are executed. Stage 243 includes looking for each updated event, updated operator, updated key or updated miscellaneous situation attribute that are relevant to the detection of a situation. Stage 243 is followed by stage 244 of re-starting these one or more situations. For example, if a certain situation ignores one or more event attributes but is responsive to other event attributes of the same event than an update of an ignored event attribute will not cause the method to restart the detection of that certain situation.

If a situation correlative oriented partial update mode is selected than stages 245 and 246 are executed. Stage 245 includes looking for each updated event, updated operator, updated key or updated miscellaneous situation attribute and determining if the runtime information (detection of the occurrence of events) accumulated before the update does not comply with the updated definition of one or more situation.

Stage 245 is followed by stage 246 of re-starting these one or more situations. If, for example, the runtime information that accumulated before the situation definition update then the detection of the updated situation is responsive to the previously accumulated runtime information. For example, assuming that a certain situation is detected if a sequence of events that includes events e1, e2 and e3 occur during a certain lifespan. Assuming, that after event e1 and e2 occur and before the lifespan ends, the definition of the situation is updated to include a sequence of events e1, e2 and e4. In this case the method will search for the occurrence of event e4, (within the already started lifespan) as events e1 and e2 were already detected. If, on the other hand, the definition is updated to include a sequence of events e1, e4 and e2 then the situation detection will be restarted, as the detected sequence includes events e1 and e2 that does not comply with the updated rule.

If a multiple coexisting version partial update mode is selected then stages 247 and 248 are executed. Stage 247 includes starting a detection of one or more updated situations according to the updated definitions, from the moment of the definition update.

Stage 248 includes continuing to detect situations at their older format (before the update) until their lifespan terminates or until they are detected. Once the lifespan terminates of the situation is detected the updated rules are applied.

Figure 3:
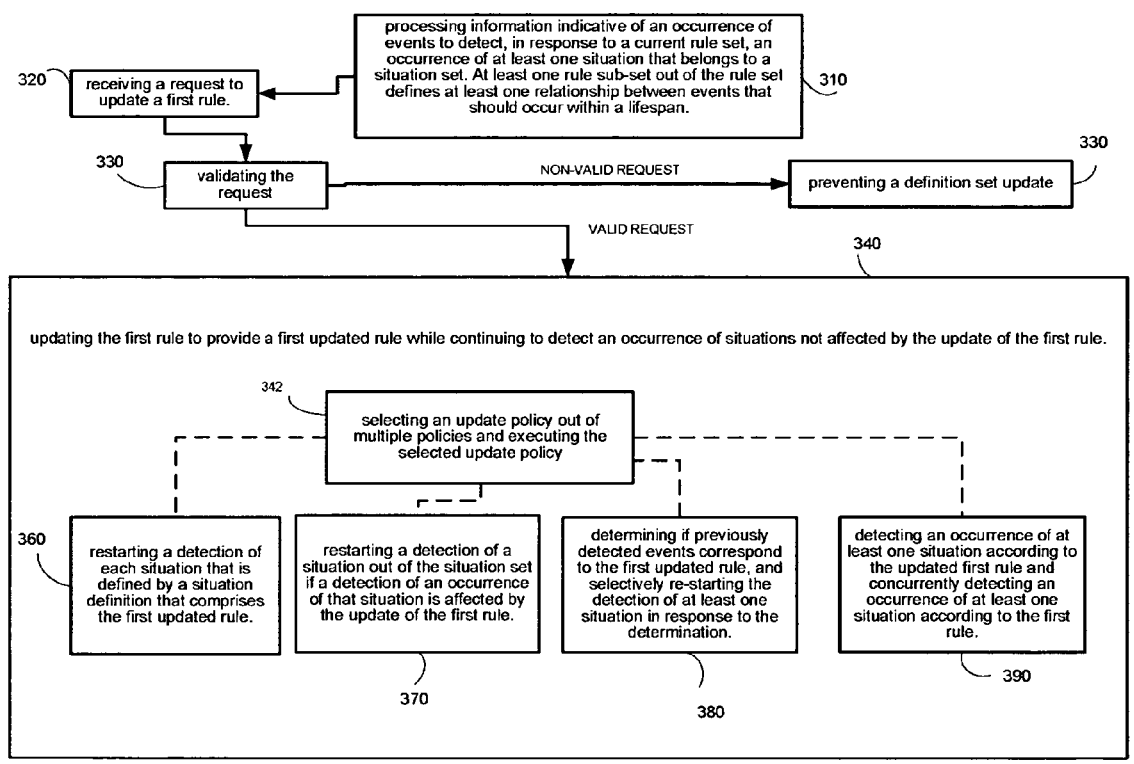
FIG. 3 illustrates a method for situation monitoring, according to another embodiment of the invention.

FIG. 3 illustrates method 300 for situation monitoring.

Method 300 starts by stage 310 of processing information indicative of an occurrence of events to detect, in response to a current rule set, an occurrence of at least one situation that belongs to a situation set. At least one rule sub-set out of the rule set defines at least one relationship between events that should occur within a lifespan.

Stage 310 is followed by stage 320 of receiving a request to update a first rule.

Stage 320 is followed by stage 330 of validating the request and rejecting non-valid requests.

If the update request is valid stage 330 is followed by stage 340 of updating the first rule to provide a first updated rule while continuing to detect an occurrence of situations not affected by the update of the first rule.

Conveniently, stage 340 includes selecting an update policy out of multiple policies and executing the selected update policy. The selection is indicated by box 342. These different update polices are represented by stages 360, 370, 380 and 390. Box 342 is connected to the different stages by dashed lines.

Stage 360 includes restarting a detection of each situation that is defined by a situation definition that comprises the first updated rule.

Stage 370 includes restarting a detection of a situation out of the situation set if a detection of an occurrence of that situation is affected by the update of the first rule.

Stage 380 includes determining if previously detected events correspond to the first updated rule, and selectively re-starting the detection of at least one situation in response to the determination.

Stage 390 includes detecting an occurrence of at least one situation according to the updated first rule and concurrently detecting an occurrence of at least one situation according to the first rule.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

According to an embodiment of the invention data is written to a write-back cache unit, and current as well and previous data versions are sent to one or more storage units such as disks, disk arrays, tapes and the like. The data storage policy helps to refresh the data as well as the metadata and also assists in determining whether to send a certain data version to the disk or not.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for situation monitoring, the method comprising: processing, by a complex event processing engine, information indicative of an occurrence of events to detect an occurrence of at least one situation that belongs to a situation set; wherein the detections is responsive to a current rule set; wherein at least one rule sub-set out of the rule set defines at least one relationship between events that should occur within a lifespan; receiving a request to update a first rule; updating the first rule to provide a first updated rule while continuing to detect, by the complex event processing engine, an occurrence of situations not affected by the update of the first rule.

2. The method according to claim 1 wherein the receiving is followed by validating the request and rejecting a non-valid request.

3. The method according to claim 1 wherein the updating is followed by restarting a detection of each situation that is defined by a situation definition that comprises the first updated rule.

4. The method according to claim 1 wherein the updating is followed by restarting a detection of a situation out of the situation set if a detection of an occurrence of that situation is affected by the update of the first rule.

5. The method according to claim 1 wherein the updating is followed by determining if previously detected events correspond to the first updated rule, and selectively re-starting the detection of at least one situation in response to the determination.

6. The method according to claim 1 wherein the updating is followed by detecting an occurrence of at least one situation according to the updated first rule and concurrently detecting an occurrence of at least one situation according to the first rule.

* * * * *